Figure 1:
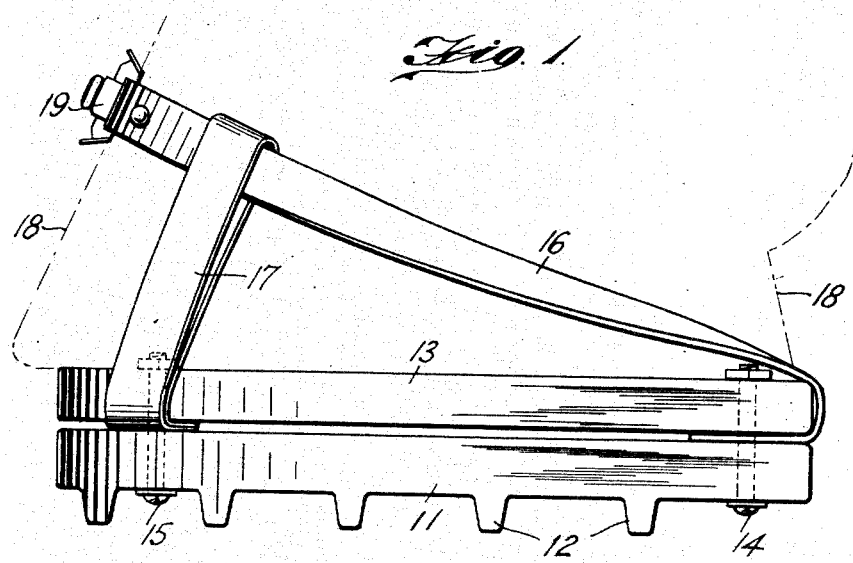

April 30, 1929.  A. WATSON  1,710,909
FOOTWEAR FOR DRAFT ANIMALS
Filed Nov. 15, 1928

Inventor
ALEXANDER WATSON
By
Attorney

Patented Apr. 30, 1929.

1,710,909

UNITED STATES PATENT OFFICE.

ALEXANDER WATSON, OF ST. CATHARINES, ONTARIO, CANADA.

FOOTWEAR FOR DRAFT ANIMALS.

Application filed November 15, 1928. Serial No. 319,531.

This invention relates to improvements in anti-skid footwear for horses and like draft animals, and has for its principal object to generally improve the construction of these devices.

Another important object is to provide a device of the class specified which will be simple, durable, efficient, and inexpensive to manufacture.

These together with other objects may be attained by the construction, combination, and arrangement of the parts as will be hereinafter fully described, illustrated in the accompanying drawing, and defined in the claim hereunto annexed.

Figure 2:
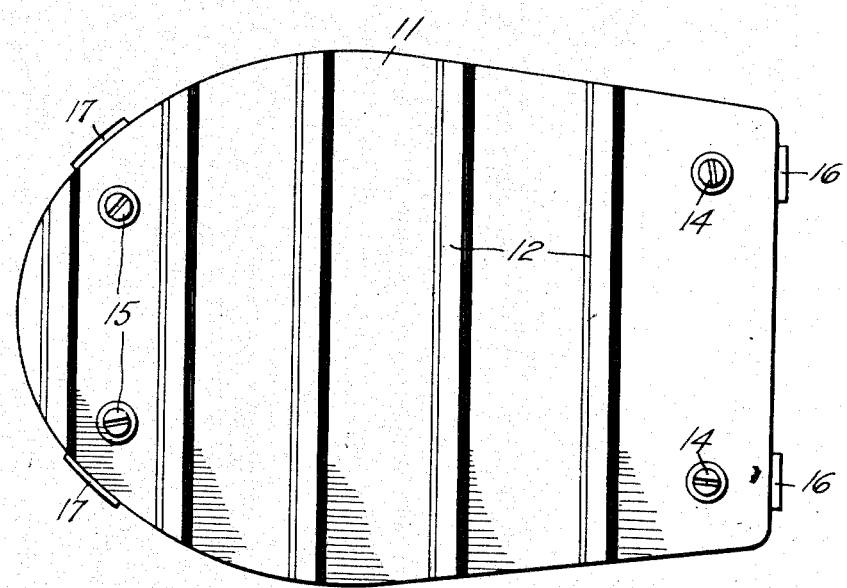

Referring to the drawing:

Fig. 1 is a side elevation of an anti-skid device constructed in accordance with this invention; and Fig. 2 is a bottom view of the same.

Similar reference characters refer to corresponding parts throughout both views.

The invention consists principally of an anti-skid tread 11 formed of live rubber and provided on the under surface with a plurality of transverse, homogeneous cleats 12 integral with and of the same elastic substance as the tread body, which are adapted to resist slipping on slippery surfaces.

The tread 11 is secured to a stiffener 13 by the bolts 14 and 15, with, however, an intervening space between for the reception of fastening straps through which the bolts 14 and 15 also pass and when tightened, firmly clamp these straps in place between said tread and said stiffener, the latter being preferably formed of sole leather.

The fastening straps comprise the binding straps 16 which are anchored at the rear of the device by the bolts 14, and the limiting straps 17 which are anchored close to the front of the device by the bolts 15.

The binding straps 16 extend forwardly and outwardly about the hoof 18 (shown in dot and dash line) and are adjustably united in front by a suitable buckle as indicated by the numeral 19, and the limiting straps 17 are looped around the binding straps to restrain the latter from slipping upwardly along the surface of the hoof.

There has thus been provided a simple and efficient device of the kind described and for the purpose specified.

It is obvious that minor changes may be made in the form and construction of the invention without departing from the material spirit thereof. It is not therefore desired to confine the invention to the exact form herein shown and described, but it is desired to include all such as properly come within the scope claimed.

Having thus described the invention, what is claimed as new is:

In footwear for draft animals, a tread portion of live rubber provided with a plurality of homogeneous cleats, a stiffener conforming to and secured to said tread by means of bolts and with an intervening space between said tread and stiffener, said stiffener being adapted to engage the hoof of an animal, straps for binding the footwear to the hoof, straps for controlling the binding straps, all said straps being anchored to the footwear by inserting them in the said intervening space and passing said bolts through them whereby they are securely clamped between said tread portion and stiffener when the bolts are tightened.

In testimony whereof I have affixed my signature.

ALEXANDER ×his mark WATSON.